United States Patent [19]

Podilchuk

[11] Patent Number: 5,748,242
[45] Date of Patent: May 5, 1998

[54] COLOR VIDEO VECTOR QUANTIZATION WITH CHROMINANCE CODEBOOK BYPASS

[75] Inventor: Christine Irene Podilchuk, Bridgewater, N.J.

[73] Assignee: Lucent Technologies Inc., Murray Hill, N.J.

[21] Appl. No.: 519,867

[22] Filed: Aug. 25, 1995

[51] Int. Cl.[6] .................................................. H04N 7/28
[52] U.S. Cl. ............................. 348/391; 348/417; 348/422
[58] Field of Search ................................. 348/422, 418, 348/417, 414, 391, 393, 394, 396, 415, 409, 390, 384; 382/253; H04N 7/137

[56] References Cited

U.S. PATENT DOCUMENTS

| | | | |
|---|---|---|---|
| 4,987,480 | 1/1991 | Lippman et al. | 348/396 |
| 5,255,090 | 10/1993 | Israelsen | 348/418 |
| 5,457,495 | 10/1995 | Hartung | 348/414 |
| 5,467,413 | 11/1995 | Barrett | 348/422 |

OTHER PUBLICATIONS

C.S. Kim et al, "Subband Coding Of Color Images Using Finite State Vector Quantization," Proc. Int. Conf. on Acous., Speech and Signal Processing, NY, 1988 (April), pp. 753–756.

Y. Feng et al., "A Dynamic Address–Vector Quantization Algorithm Based On Interblock And Intercolor Correlation For Color Image Coding", Proc. Int. Conf. on Acous., Speech and Signal Processing, 1989, pp. 1755–1758. (month not avail.).

*Primary Examiner*—Bryan S. Tung
*Attorney, Agent, or Firm*—Kenneth M. Brown

[57] ABSTRACT

A method and apparatus for low bit rate coding of color video signals in which the use of the codebook entry identified by the codebook index may be bypassed in the coding of chrominance information when it is determined that it is advantageous to do so. In particular and in accordance with an illustrative embodiment of the present invention, the method comprises the steps of generating a codebook index signal based on the luminance information of the block being coded; determining a coding error based on a comparison of the chrominance information contained in the given block and the chrominance vector represented by the generated codebook index signal; and generating a chrominance vector bypass signal based on whether the coding error exceeds a threshold. Specifically, the chrominance vector bypass signal is used to indicate whether the chrominance information of the given block has or has not been coded with use of the codebook. In one illustrative embodiment, the motion-compensated interframe prediction for the given block is used (without any interframe codebook difference vector adjustment) to code the chrominance signal when the chrominance data from the indexed codebook entry is not used (i.e., when it is bypassed).

24 Claims, 2 Drawing Sheets

COLOR VIDEO VECTOR QUANTIZATION WITH CHROMINANCE CODEBOOK BYPASS

FIELD OF THE INVENTION

The present invention relates generally to the field of video signal coding and more particularly to the coding of color video signals for use in video communications at very low bit rates.

BACKGROUND OF THE INVENTION

The coding of video signals for efficient transmission and/or storage has received a great deal of recent attention, particularly with the growing interest in technologies such as HDTV (High Definition Television) and Interactive Television (e.g., "video-on-demand"). In fact, video coding algorithms have been standardized for many of these applications (e.g., Motion Picture Experts Group standards such as MPEG-1 and MPEG-2). These applications, however, typically involve the coding of video signals at coding rates above 56 kbits/s (kilobits per second).

In video communications applications such as video telephony, however, the available bandwidth (i.e., maximum bit rate) may be substantially less than that which is available in other applications. If the coded video signal is intended for transmission across a conventional telephone line with the use of a conventional modem, for example, bit rates may well be limited to 19.2 kbits/s or even to 9.6 kbits/s based on current modem technology. For this reason, these applications require the use of video coding techniques which are extremely frugal in their use of bandwidth. And when color video signals are to be encoded, the chrominance (ie., color) information, which is typically encoded separately from the luminance (i.e., brightness) information, must be coded with an extremely small number of bits. In particular, the encoding of the chrominance information in a low bit rate coder has typically received only ten to twenty percent of the total bit rate allocated for the video data, since the luminance component of the data contains significant feature information and is therefore more important to the overall quality (e.g., the intelligibility) of the resultant video image.

One common approach to video signal coding involves the use of vector quantization codebooks. The general principles of the well-known technique of vector quantization and the use of vector quantization codebooks are described, for example, in A. Gersho and R. M. Gray, *Vector Quantization and Signal Compression*, Kluwer Academic Publishers, Boston Mass., 1992. In such an approach, each frame is typically divided into frame portions referred to as "vectors" or "blocks." Each of these blocks contains the signal data for a plurality of pixels (individual picture elements). Depending, for example, on the available bit rate, some or all of these blocks are then quantized and compared with entries in a codebook to find the best match. The index of the best matching codebook entry is then transmitted to the decoder which contains an identical codebook. Thus, the codebook entry index is used to represent the given block. This form of coding, in which the pixels of a given frame are coded irrespective of the content of other frames, is known as "intraframe" coding.

Frequently, the blocks to be coded are transformed into a frequency domain (e.g., with use of a Discrete Cosine Transformation) before quantization, and a corresponding inverse transformation is performed by the decoder. In such cases the codebook entries are therefore frequency domain entries.

A video coder may make use of "interframe" coding techniques, in addition to the previously described intraframe coding technique, when it is advantageous to do so. In interframe coding, each block to be coded is compared with a corresponding block of pixels from a previous frame, and the difference between the two (or, more commonly, its transform) is quantized and matched against an "interframe" codebook (separate and distinct from the "intraframe" codebook described above) which contains difference entries. Then the best matching entry to this difference is used to code the block. Moreover, the pixels from the previous frame may be "motion compensated" in order to produced a better match (i.e., a smaller difference from the block to be coded). That is, portions of the previous frame are relocated within the image and compared to the current frame to determine "motion vectors" which represent the movement in the scene. Motion-compensated interframe coding is typically used when it is determined that the given block will be more accurately coded by doing so as compared to using intraframe coding on the given block. In particular, an "error function," such as the well-known mean-squared error, is consulted to determine which coding technique results in a smaller error as compared to the original data.

When performing interframe coding, it is advantageous to incorporate the decoder circuitry within the encoder to "reconstruct" the previous frame data. In this manner, the difference analysis performed by the encoder will advantageously be based on the decoded previous frame (since the decoding of the current frame in the decoder will also be so based), thereby resulting in a more accurate coding of the present frame.

When monochrome video signals are to be coded, each pixel of a given image may be considered to comprise a single value which reflects the brightness level of the pixel on a gray scale. But when color video signals are to be coded, three independent data "channels" are usually encoded. For example, in accordance with the well-known CCIR 601 international standard, the three channels comprise a digital representation of the luminance (i.e., brightness), typically denoted Y, and digital representations of two independent chrominance channels. These chrominance channels, which may, for example, be denoted $C_b$ and $C_r$, reflect a blue chrominance component and a red chrominance component, respectively. (Specifically, in accordance with the standard, the $C_b$ channel comprises a representation of the difference Y minus the blue chrominance component, and the $C_r$ channel comprises a representation of the difference Y minus the red chrominance component.)

In higher bit rate color video coders, the chrominance information may be coded by adding at least two additional codebooks to the codebook provided for the luminance information. These added codebooks comprise vectors which will be used to represent the two independent chroma channels, $C_b$ and $C_r$. (If both intraframe coding and interframe coding are supported, then four additional codebooks will be added for the chrominance information to the two luminance codebooks.) Then, for each block, three indices, rather than one, are used—each index identifying an entry in a corresponding one of the codebooks.

Most of the previous work at low bit rates, however, has focused on coding only the luminance component. Since so little of the bit rate is available for coding the chrominance information in these very low bit rate coders, the chrominance information in these coders is commonly coded "along with" the luminance information by using only a single codebook index. In other words, the same index is used to identify the vector to be selected from each of the three codebooks. (Note, of course, that such an approach is functionally equivalent to providing a single codebook which contains combined luminance and chrominance information in each entry. As such, all references made herein to the use of "a codebook" include the use of a plurality of codebooks referenced by the same index, and vice versa.) Unfortunately, it may often be the case that the best codebook entry for use in coding the luminance information corresponds to poor codebook entries for use in coding the chrominance information.

SUMMARY OF THE INVENTION

In accordance with the present invention, a method and apparatus for low bit rate coding of color video signals is provided in which the codebook entry identified by the codebook index may be bypassed (e.g., ignored) in the coding of chrominance information when it is determined that it is advantageous to do so. In particular and in accordance with an illustrative embodiment of the present invention, a method for coding color video signals is provided, the method comprising the steps of generating a codebook index signal based on the luminance information of the block being coded; determining a coding error based on a comparison of the chrominance information contained in the given block and the chrominance vector represented by the generated codebook index signal; and generating a chrominance vector bypass signal based on whether the coding error exceeds a threshold. Specifically, the chrominance vector bypass signal may be used to indicate whether the chrominance information of the given block has or has not been coded with use of the codebook.

The illustrative method of the present invention determines a codebook index based on, for example, a best match of the given block's luminance data with the luminance data in the various codebook entries, and then determines, based on an error criterion, whether the corresponding chrominance data of the selected codebook entry will also be used to encode the chrominance information. If it is deemed that it should not, another coding technique (or none at all) may advantageously be used for the coding of the given block's chrominance information. In one illustrative embodiment, for example, the motion-compensated interframe prediction for the given block is used (without any interframe codebook difference vector adjustment) to code the chrominance signal when the chrominance data from the indexed codebook entry is not used (i.e., when it is bypassed).

DETAILED DESCRIPTION

The illustrative embodiment of the present invention described herein is an extension of a video coding system described in detail in co-pending patent application "Adaptive Video Coder with Dynamic Bit Allocation," by John Hartung, Ser. No. 08/248,982, filed on May 25, 1994 and assigned to the assignee of the present invention. "Adaptive Video Coder with Dynamic Bit Allocation," which has been allowed and for which the issue fee has been paid, is hereby incorporated by reference as if fully set forth herein.

The coding system in accordance with an illustrative embodiment of the present invention comprises a forward adaptive codebook scheme, in which information from the frame to be coded is used to modify the codebook. As is well known to those skilled in the art, adaptive codebooks, which are described, for example, in Chapter 11 of Gersho and Gray, change over time in an attempt to provide a better match to the local statistics of the signal being coded. That is, the codebook, and thereby the coder, adapts to the characteristics of the signal. In a video application, such an approach can result in an improved quality of the decoded video, since the coder is, in effect, adapting itself to the given scene (i.e., the particular objects and motion contained therein).

Forward adaptive codebook schemes in particular use information from the frame to be coded to modify and, hopefully, thereby improve, the codebook. Such techniques typically replace one or more of the codebook entries with new entries before coding the current frame. Blocks which might otherwise not be coded well (i.e., coded with too large an error) might form the basis of a new codebook entry, thereby, e.g., resulting in an improved or even error-free coding of the given block. However, since the decoder must be supplied with the codebook update, additional information, known as "side" information, has to be separately coded and transmitted by these forward adaptive techniques, so that the current frame can be properly decoded by the decoder.

Figure 1:
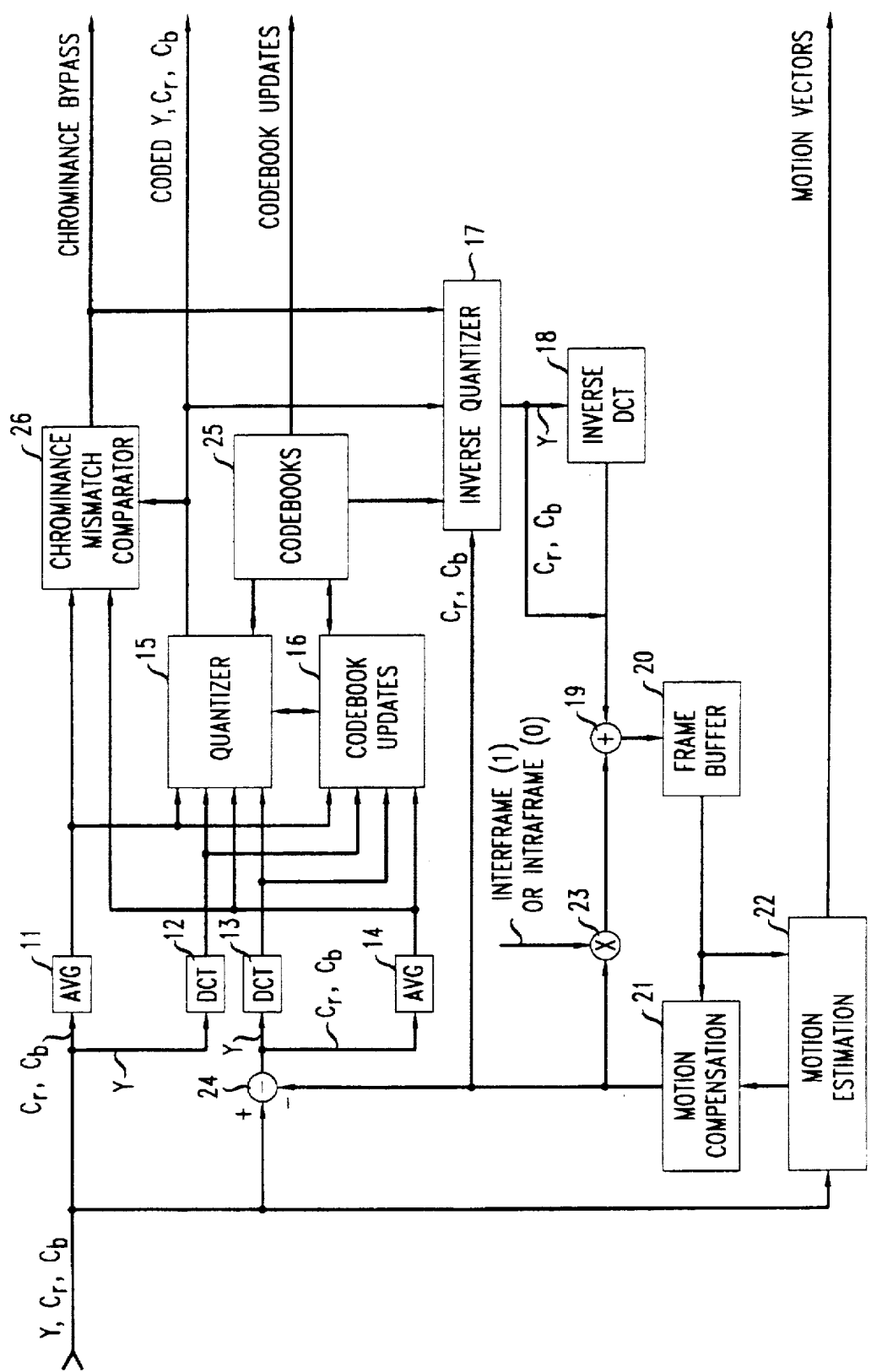
FIG. 1 shows a block diagram of a color video encoder in accordance with an illustrative embodiment of the present invention.
Figure 2:
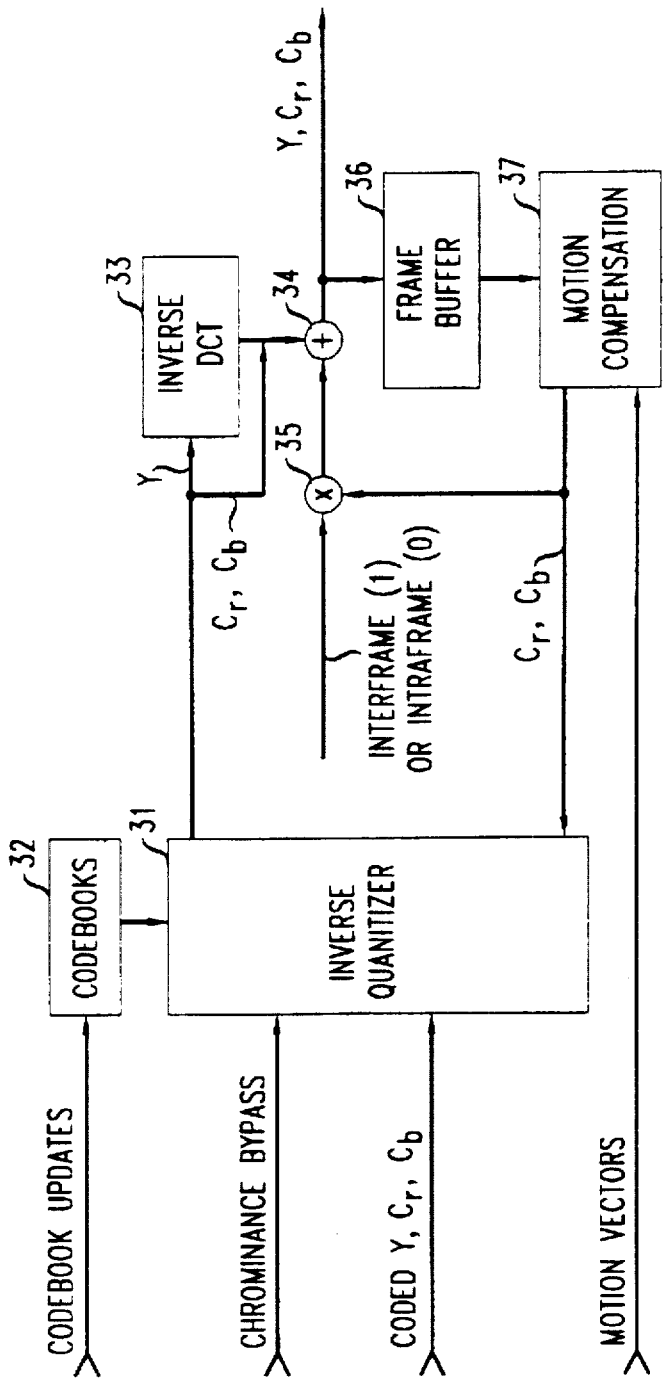
FIG. 2 shows a block diagram of a color video decoder, corresponding to the color video encoder of FIG. 1, in accordance with an illustrative embodiment of the present invention.

Specifically, the coder of the illustrative embodiment described herein is based on a scheme employing both intraframe coding and motion compensation intraframe coding techniques using a vector quantization codebook. FIG. 1 shows a block diagram of a color video encoder in accordance with this illustrative embodiment of the present invention, and FIG. 2 shows a block diagram of a corresponding decoder. The basic components of the illustrative encoder include a block-based motion-compensated predictor and a hybrid scalar/vector quantizer which adapts to the changing characteristics of the input video sequence. The input sequence provided to the illustrative coder is furnished in the well-known standard format know as CIF (Common Intermediate Format). Each frame of the input CIF sequence is specified in terms of its luminance component (Y) and two chrominance components ($C_r$ and $C_b$). The chrominance components are advantageously subsampled by two in both the horizontal and vertical directions since their spatial bandwidth is known to be about ⅓ of that of the luminance component.

The first step in the illustrative video coding system is to further downsample the luminance by a factor of 3 and the chrominance components by a factor of 6 both horizontally and vertically. Consequently, the two chroma channels are reduced to ¼ the luminance resolution in each of the horizontal and vertical directions. The successive downsampled frames are partitioned into blocks of size 8×8 for the luminance and 2×2 for the chrominance. In the block diagram of FIG. 1, the video input signal (labeled as Y, $C_r$, $C_b$) is presumed to have already been downsampled and partitioned in this manner.

Blocks in a given frame are encoded using one of two basic techniques—interframe coding and intraframe coding. In interframe mode, the coder operates on the motion-compensated difference blocks while, in intraframe mode, the coder operates directly on the data in the blocks. In order to reduce the spatial redundancy, the 8×8 luminance blocks are transformed into the frequency domain with use of a DCT (Discrete Cosine Transformation), while the 2×2 chrominance blocks are reduced to 1×1 scalar blocks by performing an averaging operation. The chrominance data is thereby encoded at ⅛ of the luminance resolution in each of the horizontal and vertical directions. In particular, in the system shown in FIG. 1, DCT 12 transforms intraframe block luminance data into the frequency domain; averager 11 performs an averaging operation on an intraframe block of chrominance data; DCT 13 transforms interframe block luminance data into the frequency domain; and averager 14 performs an averaging operation on an interframe block of chrominance data.

The transformed luminance and chrominance blocks are vector quantized by quantizer 15 with use of codebooks 25. Codebooks 25 comprise both interframe and intraframe codebooks, each containing both luminance and chrominance data. The quantized data may be advantageously entropy coded before being stored or transmitted to the decoder. (Entropy coders and decoders, which are conventional, are not shown in FIGS. 1 or 2). Note that the scalar chrominance values are quantized directly since, in this case, the DCT does not provide significant additional compression.

A reverse process—namely, an inverse quantization (performed by inverse quantizer 17) and an inverse DCT transformation for the luminance data (performed by inverse DCT 18)—produces the reconstructed frame which is then stored in frame buffer 20 for use in interframe coding for subsequent frames. Note that for interframe coded blocks, adder 19 adds the inverse quantized difference data to a (motion compensated) corresponding block from the previously stored frame, as passed from motion compensation 21 via multiplier 23. Specifically, multiplier 23 multiplies the previously stored frame block by 0 for intraframe coded blocks and by 1 for interframe coded blocks, thereby causing adder 19 to have no effect on data from intraframe coded blocks, but the above-mentioned additive effect for interframe coded blocks.

As described above and in "Adaptive Video Coder with Dynamic Bit Allocation," the illustrative vector quantizer adapts and learns about the characteristics of the scene as the sequence progresses. For that purpose, two adaptive codebooks, one for encoding the difference blocks (interframe codebook) and one for encoding the data blocks (intraframe codebook), comprise codebooks 25 of the illustrative system of FIG. 1. These codebooks are generated and continuously updated by codebook update 16. Whenever codebooks 25 are updated, codebook update 16 also sends these updates (which may advantageously be in the form of entropy coded update vectors) to the decoder, so that the decoder codebooks can be correspondingly updated.

Specifically, new codebooks are formed by replacing the "less useful" vectors in the current codebooks by new vectors such that the resulting set of vectors better represent the spatial content of the scene. For a given block, determining the best codevector, as well as deciding on which codebook to use and when to update a codebook, is based on reducing the distortion (i.e., error) in the luminance component and on minimizing the number of bits per update. In this illustrative embodiment, the mean-square error is used as the measure of distortion.

Because of the low bit rate required, the luminance and chrominance components are predicted using the same set of motion vectors. In this manner, and since the same codebook index which is used to code the luminance information is used to code the chrominance information, no additional overhead is required to code the chrominance data. The motion vectors are advantageously estimated, however, using only the luminance information. Specifically, motion estimation 22 compares the previously stored frame from frame buffer 20 with the current block to be coded and determines the motion vectors in a conventional manner. These motion vectors may be entropy coded (not shown in FIG. 1) before being stored or transmitted to the decoder. Motion compensation 21 uses the motion vectors to form a prediction block (based on the previously stored frame) to be used by subtracter 24 in computing difference data for (potential) use in interframe coding of the current block.

Initially, the interframe and intraframe codebooks are empty (e.g., initialized to constant black vectors). The codebooks progressively get generated and updated by codebook update 16 to reflect the changing characteristics of the input sequence. Blocks are quantized in the order of decreasing luminance prediction error. For a block B, if the resulting luminance quantization error is large (as compared, for example, to a given threshold), this block may be used in updating either the interframe or intraframe codebook. The codebook update is performed by sending an update vector consisting of the luminance and chrominance components of either the difference (interframe) block corresponding to B or of the actual data (intraframe) block B, whichever one of the two requires fewer bits for storage or transmission to the decoder. The update vector can then be utilized to modify and improve the corresponding codebook such that the overall distortion is minimized.

In one illustrative embodiment, the update vector is simply inserted in the appropriate interframe or intraframe codebook by replacing the least used and, thereby, the presumably least representative codevector. This new codevector would then represent the best possible match for encoding block B. However, since bits need to be allocated for sending update vectors to the decoder, the codebook adaptation is done at the expense of vector quantizing fewer blocks. This is because the above quantization/update steps are repeated for blocks with decreasing (luminance) prediction error until the allowed fixed number of bits per frame has been consumed.

As described above, pairs of correlated luminance and chrominance vectors are combined into an update vector and stored in the same codebook entry. That is, only one index is used to code both the luminance and chrominance content of an image block by selecting the best codebook vector based solely on the best luminance match. Consequently, the codebook size (i.e., the number of entries) and the bit rate are not expanded to accommodate the chrominance information. However, the best luminance match might not always correspond to a good chrominance match.

Note also that while the codebook updates continuously correct for both luminance and chrominance distortions, the update and quantization steps aim at minimizing the distortion in the luminance, since the luminance data contains the most significant feature information. Thus, blocks with a small distortion in their luminance content might still have a large chrominance distortion which is, in fact, not improved by the update and quantization steps. These blocks may result in visually distracting artifacts since the color in a large block (e.g., 24×24 in a reconstructed CIF frame) may be incorrect. For these reasons, it is advantageous to correct for such a chrominance mismatch in accordance with an illustrative embodiment of the present invention. In particular, the illustrative embodiment of the present invention shown in FIG. 1 advantageously corrects for such a chrominance mismatch without introducing significant overhead, adding at most a 1-bit correction symbol for each block.

Specifically, chrominance mismatch comparator 26 of the illustrative encoder of FIG. 1 compares the coded chrominance data as generated from quantizer 15 with the original, uncoded chrominance data provided by averager 11 to determine the resultant coding error. In particular, it compares the resultant coding error with that which would result if the chrominance data from the interframe predicted block were used directly (i.e., without difference data from the interframe codebook being added thereto). The data provided by averager 14 is, of course, precisely that latter error. If the use of the predicted chrominance data (used directly) is found to result in a smaller coding error than the use of the quantized chrominance data, the chrominance bypass signal is activated for the given block. The activation of the chrominance bypass signal informs the decoder (and the decoder "portion" of the encoder) that the quantized (i.e., codebook-based) data is to be used to decode the luminance information, but the interframe prediction data is to be used to decode the chrominance information. In this manner, the codebooks will not be used for the chrominance information when they would, in fact, do a poor job of coding such information.

Note that in addition to providing the chrominance bypass signal to the decoder, it is provided to inverse quantizer 17 of the encoder (since the illustrative encoder of FIG. 1 advantageously includes decoding circuitry for use in interframe coding). In this manner, inverse quantizer 17 can "decode" the chrominance information by directly using the interframe predicted block chrominance data whenever the chrominance bypass signal has been activated.

It may be observed that the most noticeable distortions in the chrominance content are mainly produced by two types of blocks: the intraframe encoded blocks which were not used in the update step and the non-quantized predicted blocks with non-zero motion vectors. For the illustrative coding scheme described herein, the number of such blocks per frame is typically small. Therefore, in one illustrative embodiment of the present invention, the 1-bit correction symbol may advantageously be provided only for each block corresponding to one of the aforementioned types, thereby introducing even less overhead than 1-bit per coded block.

FIG. 2 shows a block diagram of a color video decoder, corresponding to the color video encoder of FIG. 1, in accordance with an illustrative embodiment of the present invention. The operation of the illustrative decoder of FIG. 2 is similar to that of the decoder "portion" of the illustrative encoder of FIG. 1 and described above. Specifically, an inverse quantization is performed by inverse quantizer 31 and an inverse DCT transformation for the luminance data is performed by inverse DCT 33. Codebooks 32 provide the codebook vectors for use by inverse quantizer 31 in decoding the encoded signals. However, in accordance with this illustrative embodiment of the present invention, if the chrominance bypass signal is activated for a given block, inverse quantizer generates the decoded chrominance data for that block based on the (motion compensated) interframe prediction, rather than based on the chrominance data extracted from the codebook.

In order to produce the final reconstructed frame data (i.e., labeled in FIG. 2 as Y, $C_r$, $C_b$) for interframe blocks, adder 34 adds the inverse quantized difference data to the (motion compensated) corresponding block from the previously stored frame as passed by multiplier 35. Specifically, multiplier 35 multiplies the previously stored frame block by 0 for intraframe coded blocks and by 1 for interframe coded blocks, thereby causing adder 34 to have no effect on data from intraframe coded blocks, but the above-mentioned additive effect for interframe coded blocks. The reconstructed frame data, in addition to being provided as the decoder output, is stored in frame buffer 36 for use in interframe coding for subsequent frames. Finally, motion compensation 37 uses the motion vectors supplied by the encoder to form a prediction block (based on the previously stored frame) to be used in decoding interframe coded blocks in subsequent frames and, in accordance with the illustrative embodiment of the present invention, to be used by inverse quantizer 31 for chrominance data when the chrominance bypass signal has been activated.

For clarity of explanation, the illustrative embodiment of the present invention is presented as comprising individual functional blocks. The functions these blocks represent may be provided through the use of either shared or dedicated hardware, including, but not limited to, hardware capable of executing software. For example, the functions of blocks presented in FIGS. 1 and 2 may be provided by individual processors or by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

I claim:

1. A method of coding a color video signal with use of a vector quantization codebook, the color video signal comprising a succession of frames, each of the frames comprising one or more frame portions, each of the frame portions comprising luminance information and chrominance information, the codebook comprising a plurality of entries, each codebook entry comprising a luminance vector and a chrominance vector, each of the luminance vectors representative of luminance information and each of the chrominance vectors representative of chrominance information, the method comprising the steps of:

generating a codebook index signal based on at least the luminance information of one of the frame portions of one of the frames, the codebook index signal representative of one of the luminance vectors and one of the chrominance vectors;

determining a first coding error based on said one of the chrominance vectors represented by the codebook index signal;

coding the luminance information of said one of the frame portions of one of the frames with use of the codebook index signal; and generating a chrominance codebook bypass signal based on a comparison of the first coding error and a threshold value, the chrominance codebook bypass signal indicating whether the chrominance information of said one of the frame portions of one of the frames has been coded with use of the codebook.

2. The method of claim 1 wherein the step of determining the first coding error comprises comparing the chrominance information of said one of the frame portions of one of the frames with said one of the chrominance vectors represented by the codebook index signal.

3. The method of claim 2 further comprising the steps of:

generating a prediction for said one of the frame portions of one of the frames, the prediction based on a corresponding frame portion of a previous one of the frames;

determining a second coding error based on a comparison of the chrominance information of said one of the frame portions of one of the frames and the chrominance information of the prediction for said one of the frame portions of one of the frames; and determining the threshold value based on the second coding error.

4. The method of claim 3 wherein the prediction is based on a motion compensated frame portion of the previous one of said frames.

5. The method of claim 1 wherein the chrominance information of said one of the frame portions and the chrominance information represented by the chrominance vector represented by the codebook index signal comprise intraframe coded data.

6. The method of claim 1 wherein the chrominance information of said one of the frame portions and the chrominance information represented by the chrominance vector represented by the codebook index signal comprise interframe coded difference data.

7. The method of claim 6 wherein the interframe coded difference data comprises motion compensated interframe coded difference data.

8. The method of claim 1 comprising the further step of determining, based on the luminance information of said one of the frame portions of one of the frames, that the chrominance codebook bypass signal is to be generated.

9. A method of decoding a coded color video signal with use of a vector quantization codebook, the color video signal comprising a succession of frames, each of the frames comprising one or more frame portions, each of the frame portions comprising luminance information and chrominance information, the codebook comprising a plurality of entries, each codebook entry comprising a luminance vector and a chrominance vector, each of the luminance vectors representative of luminance information and each of the chrominance vectors representative of chrominance information, the method comprising the steps of:

receiving a codebook index signal associated with one of the frame portions of one of the frames, the codebook index signal representative of one of the luminance vectors and one of the chrominance vectors;

generating decoded luminance data for said one of the frame portions of one of the frames based on the codebook index signal; and receiving a chrominance codebook bypass signal indicating whether the chrominance information of said one of the frame portions of one of the frames has been coded with use of the codebook.

10. The method of claim 9 further comprising the step of generating decoded chrominance data for said one of the frame portions of one of the frames based on the codebook index signal when the chrominance codebook bypass signal indicates that the chrominance information of said one of the frame portions of one of the frames has been coded with use of the codebook.

11. The method of claim 9 further comprising the steps of:

generating a prediction for said one of the frame portions of one of the frames, the prediction based on decoded data for a corresponding frame portion of a previous one of the frames; and generating decoded chrominance data for said one of the frame portions of one of the frames based on the prediction for said one of the frame portions of one of the frames when the chrominance codebook bypass signal indicates that the chrominance information of said one of the frame portions of one of the frames has not been coded with use of the codebook.

12. The method of claim 11 wherein the prediction is based on decoded data for a motion compensated frame portion of the previous one of said frames.

13. The method of claim 9 wherein the decoded chrominance data for said one of the frame portions and the chrominance information represented by the chrominance vector represented by the codebook index signal comprise intraframe coded data.

14. The method of claim 9 wherein the decoded chrominance data for said one of the frame portions and the chrominance information represented by the chrominance vector represented by the codebook index signal comprise interframe coded difference data.

15. The method of claim 14 wherein the interframe coded difference data comprises motion compensated interframe coded difference data.

16. The method of claim 9 further comprising the step of determining, based on the decoded luminance data for said one of the frame portions of one of the frames, that the chrominance codebook bypass signal is to be received.

17. An encoder for coding a color video signal with use of a vector quantization codebook, the color video signal comprising a succession of frames, each of the frames comprising one or more frame portions, each of the frame portions comprising luminance information and chrominance information, the codebook comprising a plurality of entries, each codebook entry comprising a luminance vector and a chrominance vector, each of the luminance vectors representative of luminance information and each of the chrominance vectors representative of chrominance information, the encoder comprising:

means for generating a codebook index signal based on at least the luminance information of one of the frame portions of one of the frames, the codebook index signal representative of one of the luminance vectors and one of the chrominance vectors;

means for determining a first coding error based on said one of the chrominance vectors represented by the codebook index signal;

means for coding the luminance information of said one of the frame portions of one of the frames with use of the codebook index signal; and means for generating a chrominance codebook bypass signal based on a comparison of the first coding error and a threshold value, the chrominance codebook bypass signal indicating whether the chrominance information of said one of the frame portions of one of the frames has been coded with use of the codebook.

18. The encoder of claim 17 wherein the means for determining the first coding error comprises means for comparing the chrominance information of said one of the frame portions of one of the frames with said one of the chrominance vectors represented by the codebook index signal.

19. The encoder of claim 18 further comprising:

means for generating a prediction for said one of the frame portions of one of the frames, the prediction based on a corresponding frame portion of a previous one of the frames;

means for determining a second coding error based on a comparison of the chrominance information of said one of the frame portions of one of the frames and the chrominance information of the prediction for said one of the frame portions of one of the frames; and means for determining the threshold value based on the second coding error.

20. The encoder of claim 17 further comprising means for determining, based on the luminance information of said one of the frame portions of one of the frames, that the chrominance codebook bypass signal is to be generated.

21. A decoder for decoding a coded color video signal with use of a vector quantization codebook, the color video signal comprising a succession of frames, each of the frames comprising one or more frame portions, each of the frame portions comprising luminance information and chrominance information, the codebook comprising a plurality of entries, each codebook entry comprising a luminance vector and a chrominance vector, each of the luminance vectors representative of luminance information and each of the chrominance vectors representative of chrominance information, the decoder comprising:

means for receiving a codebook index signal associated with one of the frame portions of one of the frames, the codebook index signal representative of one of the luminance vectors and one of the chrominance vectors;

means for generating decoded luminance data for said one of the frame portions of one of the frames based on the codebook index signal; and means for receiving a chrominance codebook bypass signal indicating whether the chrominance information of said one of the frame portions of one of the frames has been coded with use of the codebook.

22. The decoder of claim 21 further comprising means for generating decoded chrominance data for said one of the frame portions of one of the frames based on the codebook index signal when the chrominance codebook bypass signal indicates that the chrominance information of said one of the frame portions of one of the frames has been coded with use of the codebook.

23. The decoder of claim 21 further comprising:

means for generating a prediction for said one of the frame portions of one of the frames, the prediction based on decoded data for a corresponding frame portion of a previous one of the frames; and means for generating decoded chrominance data for said one of the frame portions of one of the frames based on the prediction for said one of the frame portions of one of the frames when the chrominance codebook bypass signal indicates that the chrominance information of said one of the frame portions of one of the frames has not been coded with use of the codebook.

24. The decoder of claim 21 further comprising means for determining, based on the decoded luminance data for said one of the frame portions of one of the frames, that the chrominance codebook bypass signal is to be received.

* * * * *